(12) United States Patent
Weissenberger (10) Patent No.: US 9,803,832 B2
(45) Date of Patent: Oct. 31, 2017

(54) LIGHTING DEVICE WITH A PHOSPHOR BODY SPACED APART FROM A LIGHT SOURCE

(71) Applicant: OSRAM GmbH, Munich (DE)

(72) Inventor: Daniel Weissenberger, Giengen (DE)

(73) Assignee: OSRAM GMBH, Munich (DE)

(*) Notice: Subject to any disclaimer, the term of this patent is extended or adjusted under 35 U.S.C. 154(b) by 181 days.

(21) Appl. No.: 14/814,522

(22) Filed: Jul. 31, 2015

(65) Prior Publication Data
US 2016/0033112 A1  Feb. 4, 2016

(30) Foreign Application Priority Data

Aug. 1, 2014 (DE) .................. 10 2014 215 221

(51) Int. Cl.
| | |
|---|---|
| *F21V 9/16* | (2006.01) |
| *F21S 8/10* | (2006.01) |
| *F21V 25/02* | (2006.01) |
| *B60Q 1/00* | (2006.01) |
| *B60Q 11/00* | (2006.01) |
| *F21Y 115/30* | (2016.01) |

(52) U.S. Cl.
CPC .............. *F21V 9/16* (2013.01); *B60Q 1/0023* (2013.01); *B60Q 11/002* (2013.01); *F21S 48/1145* (2013.01); *F21S 48/1225* (2013.01); *F21V 25/02* (2013.01); *F21Y 2115/30* (2016.08)

(58) Field of Classification Search
CPC ......... F21V 9/16; F21V 25/02; B60Q 1/0023; B60Q 11/002; B60Q 1/00; F21S 48/1145; F21S 48/1225; F21S 48/00; F21S 48/11; F21S 48/21; F21Y 2115/30; F21K 2/00; F21K 9/00
See application file for complete search history.

(56) References Cited

U.S. PATENT DOCUMENTS

| | | | | |
|---|---|---|---|---|
| 9,261,259 B2* | 2/2016 | Shiomi | ............... | B60Q 1/0023 |
| 9,328,887 B2* | 5/2016 | Hu | ...................... | F21S 48/1225 |
| 2011/0157865 A1 | 6/2011 | Takahashi et al. | | |
| 2015/0377430 A1* | 12/2015 | Bhakta | ................ | F21S 48/1145 362/84 |

FOREIGN PATENT DOCUMENTS

DE   10 2012 220 481 A1   5/2014

OTHER PUBLICATIONS

German Search Report based on application No. 10 2014 215 221.6 (6 pages) dated May 7, 2015 (for reference purpose only).

* cited by examiner

*Primary Examiner* — Bao Q Truong
(74) *Attorney, Agent, or Firm* — Viering, Jentschura & Partner mbB (57) ABSTRACT

In various embodiments, a lighting device is provided. The lighting device includes at least one light source for emitting primary light, at least one phosphor body which is illuminatable by the primary light and is spaced apart from the at least one light source, and at least one light scattering body which is situated optically downstream of the phosphor body in a light propagation direction of the primary light that is uninfluenced by the phosphor body. The lighting device is designed in the case of an intact phosphor body to generate an illumination pattern by light generated by the phosphor body, and otherwise to generate a light emission pattern by light generated by the at least one light scattering body. The light emission pattern differs from the illumination pattern.

13 Claims, 6 Drawing Sheets

LIGHTING DEVICE WITH A PHOSPHOR BODY SPACED APART FROM A LIGHT SOURCE

CROSS-REFERENCE TO RELATED APPLICATION

This application claims priority to German Patent Application Serial No. 10 2014 215 221.6, which was filed Aug. 1, 2014, and is incorporated herein by reference in its entirety.

TECHNICAL FIELD

Various embodiments relate generally to a lighting device, including at least one light source for emitting primary light and at least one phosphor body which is illuminatable by the primary light and is spaced apart from the at least one light source. Various embodiments are applicable, for example, as a vehicle lighting device, e.g. as a headlight. Further possibilities for application are luminaires for the entertainment and effect lighting industry and for medical lighting. Various embodiments are applicable, for example, to the case where the at least one light source is embodied as at least one laser.

BACKGROUND

A headlight including a phosphor body illuminated by a laser (so-called LARP; "Laser Activated Remote Phosphor"), often has a protection mechanism which, in the case of failure (i.e. damage or even removal) of the phosphor body prevents direct laser light of high intensity from emerging. In this case, a distinction can be drawn between passive protection mechanisms (in which the headlight is configured such that the laser light is blocked in the case of failure) and active protection mechanisms (in which the case of failure is detected and the laser is then switched off). In both cases, light no longer emerges from the headlight in the event of a failure. It is disadvantageous here that the LARP headlight suddenly stops operating in the case of failure. This may be particularly disadvantageous if the LARP headlight as a whole has to be replaced, which is possible e.g. only in a workshop.

SUMMARY

In various embodiments, a lighting device is provided. The lighting device includes at least one light source for emitting primary light, at least one phosphor body which is illuminatable by the primary light and is spaced apart from the at least one light source, and at least one light scattering body which is situated optically downstream of the phosphor body in a light propagation direction of the primary light that is uninfluenced by the phosphor body. The lighting device is designed in the case of an intact phosphor body to generate an illumination pattern by light generated by the phosphor body, and otherwise to generate a light emission pattern by light generated by the at least one light scattering body. The light emission pattern differs from the illumination pattern.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may at least partly to overcome the disadvantages of the prior art and may provide improved traffic safety of the relevant lighting device.

Various embodiments provide a lighting device, including at least one light source for emitting primary light, at least one phosphor body which is illuminatable by the primary light and is spaced apart from the at least one light source, and at least one light scattering body which is situated optically downstream of the phosphor body in a light propagation direction of the primary light that is uninfluenced by the phosphor body. The lighting device is designed in the case of an intact phosphor body to generate an illumination pattern by means of light generated by the phosphor body and otherwise (i.e. in the case of an at least partly failing phosphor body) to generate a light emission pattern by means of light generated by the at least one light scattering body, which light emission pattern differs from the illumination pattern.

In the case of an intact or undamaged phosphor body, the primary light impinging on it is at least partly converted into secondary light having a different wavelength and, if appropriate, non-converted primary light is scattered. Since the secondary light is likewise emitted broadly, for example in a Lambertian fashion, light (secondary light or a mixture of non-converted, scattered primary light and secondary light) is emitted broadly by the undamaged phosphor body. This light generates the illumination pattern emitted by the lighting device. For this purpose, said light may be beam-shaped by a coupling-out optical unit.

In the event of a failure of the at least one phosphor body, primary light can radiate completely (e.g. in the event of detachment of the phosphor body) or partly (e.g. in the event of damage to the phosphor body, e.g. on account of cracks or partial detachments such as holes) unimpeded with high intensity through the spatial volume which would be occupied by the phosphor body if the latter were undamaged. This spatial volume can also be designated hereinafter, without restricting the generality, as a "mounting location" for the phosphor body.

In the event of a failure of the at least one phosphor body, primary light can radiate completely (e.g. in the event of detachment of the phosphor body) or partly (e.g. in the event of damage to the phosphor body, e.g. on account of cracks or partial detachments such as holes) unimpeded with high intensity through the spatial volume which would be occupied by the phosphor body if the latter were undamaged. This spatial volume can also be designated hereinafter, without restricting the generality, as a "mounting location" for the phosphor body.

Instead of this primary light that is uninfluenced by the phosphor body being blocked or switched off, it passes further in its light propagation direction optically downstream of the mounting location and impinges on the light scattering body. At the light scattering body, the primary light is at least scattered and thus reduced in its intensity. The scattered primary light is then coupled out from the lighting device as useful light. The useful light has, for example, the predetermined light emission pattern. Consequently, even in the event of failure of the phosphor body, useful light is still emitted from the lighting device, which improves traffic safety. In the case of only partial failure of the phosphor body, part of the illumination pattern (e.g. with a lower brightness) and the light emission pattern can be generated jointly.

In normal operation, i.e. without failure of the phosphor body, the lighting device serves for illuminating a region, e.g. a roadway.

The light source may be e.g. a semiconductor light source. In various embodiments, the at least one semiconductor light source includes at least one diode laser. Alternatively, the at least one semiconductor light source may include e.g. at least one light emitting diode. If a plurality of semiconductor light sources are present, they can emit primary light having the same color or in different colors. The at least one semiconductor light source can be present in the form of at least one individually housed semiconductor light source or in the form of at least one chip. A plurality of chips can be mounted on a common substrate ("submount"). The at least one semiconductor light source can be equipped with at least one dedicated and/or common optical unit for beam guiding, e.g. at least one Fresnel lens, collimator, and so on. Instead of or in addition to the inorganic light emitting diodes, e.g. based on InGaN or AlInGaP, generally organic LEDs (OLEDs, e.g. polymer OLEDs) can also be used.

The phosphor body includes at least one phosphor suitable for converting incident primary light at least partly into secondary light having a different wavelength. If a plurality of phosphors are present, the latter may generate secondary light having mutually different wavelengths. The wavelength of the secondary light may be longer (so-called "down conversion") or shorter (so-called "up conversion") than the wavelength of the primary light. By way of example, blue primary light may be converted into green, yellow, orange or red secondary light by means of a phosphor. In the case of only partial wavelength conversion, the phosphor body emits a mixture of secondary light and non-converted primary light which can serve as useful light. By way of example, white useful light may be generated from a mixture of blue, non-converted primary light and yellow secondary light. However, a full conversion is also possible, in which either the primary light is no longer present in the useful light or only a negligible proportion of the primary light is present in the useful light. A degree of conversion depends, for example, on a thickness and/or a phosphor concentration of the phosphor. If a plurality of phosphors are present, secondary light components of different spectral compositions can be generated from the primary light, e.g. yellow and red secondary light. The red secondary light may be used for example to impart a warmer hue to useful light, e.g. so-called "warm white". If a plurality of phosphors are present, at least one phosphor may be suitable for wavelength-converting secondary light again, e.g. green secondary light into red secondary light. Such light that is wavelength-converted again from secondary light may also be designated as "tertiary light".

The fact that the phosphor body is spaced apart from the at least one light source may also be designated as "remote phosphor". In combination with at least one laser as the light source, this can also be referred to as a LARP lighting device.

The fact that the phosphor body is spaced apart from the at least one light source may encompass the fact that any free clearance, e.g. an air clearance, is situated between the at least one phosphor body and the at least one light source. The spacing apart may also encompass the fact that the at least one phosphor body and the at least one light source are separate components.

A light scattering body may be understood to be a body which, as a reflective body and/or as a transilluminatable body, scatters the primary light incident on it. The light scattering body may include for example a transparent basic or matrix material, e.g. silicone or epoxy resin, in which light scattering particles are distributed, e.g. white pigments such as titanium oxide and/or aluminum oxide, metal powder or air bubbles. The scattering makes it possible to reduce an intensity of the primary light beam e.g. to an extent such that eye damage can be precluded.

The fact that the at least one light scattering body is situated in a light propagation direction of the primary light that is uninfluenced by the phosphor body may mean, for example, that the light scattering body is situated at least partly in a light path of the primary light which arises if the phosphor body is completely or partly not present any longer in the case of failure, specifically then optically downstream of the spatial volume or mounting location provided for the phosphor body.

The illumination pattern may be understood to be, for example, a light emission pattern of the lighting device which serves for illuminating a predetermined region, e.g. a roadway.

The light emission pattern may be understood to be, for example, a light emission pattern of the lighting device which fulfills a specific light function. Such a property may also be expressed such that the lighting device in the case of failure emits an "emergency light" which increases safety but e.g. does not enable full-quality illumination as in the case of a phosphor body functioning normally.

The light emission pattern differs from the illumination pattern e.g. to the effect that it differs from the illumination pattern discernibly to a human eye, e.g. also to an end user, e.g. a driver of a motor vehicle. This affords the advantage that even an end user can readily ascertain whether a failure of the phosphor body has occurred, just by viewing the light emission pattern. By way of example, a shape, brightness, brightness distribution and/or color of the light emission pattern may differ discernibly from those/that of the illumination pattern.

In one configuration, the light emission pattern is a further illumination pattern, that is to say that it is shaped and has a brightness such as is suitable for an illumination. This may afford the advantage that a loss of the original or normal illumination function that occurs in the case of failure of the phosphor body can be at least partly compensated for by the further illumination pattern, e.g. in the sense of an "emergency lighting".

In order to be able to distinguish the original illumination pattern in the case of an intact phosphor body from the further illumination pattern in the case of failing phosphor body, in one configuration, the light emission pattern or further illumination pattern has a lower maximum radiation intensity than the normal illumination pattern. As a result, the case of failure can be ascertained in a simple manner, e.g. by a comparison with a lighting device functioning normally.

The normal illumination pattern can differ from the further illumination pattern alternatively or additionally in that it has a different shape, e.g. is narrower or does not extend as far. By way of example, it may have a smaller area of a high radiation intensity than the normal illumination pattern, e.g. a smaller bright core.

The further illumination pattern may differ from the normal illumination pattern alternatively or additionally in that it has a different color, e.g. the color of the primary light instead of a color of the secondary light or a color of a mixed light.

In a further configuration at least partly different optical units (including one or a plurality of optical elements), e.g. coupling-out optical units, are disposed downstream of the phosphor body and the light scattering body. As a result, the light emitted by the light scattering body is also beam-shapable in a targeted manner, e.g. in order to be able to fulfill an illumination function. A shared use of at least one optical element, e.g. a lens, a reflector, a diffuser, a partly transmissive filter and/or a diaphragm, etc. in the beam path or light path of the light emitted by the phosphor body and of the light emitted by the scattering body brings about a saving of components and enables a particularly compact design. By contrast, optical elements not used in a shared fashion can be used for the individual beam shaping of the illumination pattern and/or of the light emission pattern or "emergency light".

Very generally, a beam path or light path of the light emitted by the phosphor body and/or of the light emitted by the scattering body can contain an optical element which changes its optical property in a manner dependent on electrical or magnetic fields, e.g. a liquid crystal screen, an optical element utilizing the Kerr effect, etc.

In one development, no shared beam shaping optical elements are disposed downstream of the phosphor body and the light scattering body. In this regard, the associated light beams can be shaped independently of one another. In this case, in one variant, light from both bodies can radiate through optical elements not having a beam shaping effect (like a simple transparent cover).

In one development, a diffuser (e.g. a scattering lamina) is optically disposed downstream of the light scattering body. As a result, a further protection mechanism is present in order to reduce a maximum beam intensity of the primary light beam in the case of failure of the light scattering body.

In one development, moreover, the light emission pattern of the light emitted by the at least one light scattering body is a signal light. As a result, a failure of the phosphor body can be ascertained in a particularly simple manner. The signal light in particular does not generate an illumination pattern for illuminating a predetermined region that is visible. It may suffice, in particular, to indicate a presence of the lighting device, e.g. as a "position light". For this development, in particular, no further beam shaping optical element or only a diffuser may be disposed downstream of the light scattering body.

In yet another configuration, the light scattering body is a phosphor body. As a result, the light color of the primary light incident on the light scattering body can be changed. The light scattering body can then hereinafter also be designated as "emergency phosphor body" or as further or second phosphor body, without restricting the generality. The phosphor body used in normal operation for generating the normal illumination pattern may then be designated as first phosphor body or "main phosphor body". It may already be sufficient for the phosphor as such already to suffice as scattering material in order to obtain a desired beam expansion. Alternatively, in addition to the phosphor, dedicated scattering material may also be present in the light scattering body.

In one configuration, furthermore, the light scattering body is a wavelength-maintaining light scattering body, that is to say does not include a wavelength-converting phosphor. The associated light emission pattern may then radiate in the color of the primary light, e.g. in blue.

In one development, the light scattering body is situated in a "primary light shadow" of the phosphor body. This means, for example, that the primary light in the case of an intact phosphor body does not impinge directly (that is to say does not impinge in an uninfluenced manner or without interaction with the phosphor body) on the light scattering body. However, primary light that passes through the phosphor body without being converted and is scattered by it may impinge on the light scattering body. The proportion of total useful light that is made up of such primary light is typically very low, however.

In one configuration, moreover, at least one deflection element is situated between the phosphor body and the light scattering body and is designed to deflect the light propagation direction of the primary light uninfluenced by the phosphor body in the case of failure downstream of the mounting location of the phosphor body onto the light scattering body or to deflect the primary light onto the light scattering body in the case of failure. In this regard, a particularly diverse arrangement of the light scattering body can be achieved. The deflection element may be e.g. at least one fully or partly reflective reflector.

In one development, the light scattering body is arranged at an optical element disposed downstream of the phosphor body. As a result, the light associated with the light scattering body can also use for its beam shaping the optical elements provided for the beam shaping of the useful light emitted by the phosphor body. Additional optical elements for the beam shaping only of the light emitted by the light scattering body can be dispensed with. By way of example, the light scattering body may be arranged on a reflector or a lens which (e.g. with a different partial region) also emits the useful light emitted by the phosphor body.

In one configuration, moreover, the at least one light scattering body is arranged at a channel of a transmitted light optical unit. In this regard, the primary light beam passing through the mounting location of the phosphor body in an unimpeded manner in the case of a failing phosphor body can pass through the channel of the transmitted light optical unit and is not beam-shaped by the transmitted light optical unit. In, at or in the vicinity of the transmitted light optical unit, the primary light beam impinges on the light scattering body. By contrast, if the phosphor body has not failed, only a small portion of the light emerging therefrom may pass through the channel, while the majority is beam-shaped by the transmitted light optical unit.

In one configuration, furthermore, at least one light or brightness sensor (designated hereinafter as "primary light sensor", without restricting the generality) is situated in the light propagation direction of the primary light through the phosphor body (that is to say in the light path of primary light passing through the mounting location of the phosphor body in an uninfluenced manner). The failure of the phosphor body can be ascertained by the at least one primary light sensor, e.g. if an intensity or a luminous flux of the light incident on the at least one primary light sensor exceeds at least one predefined threshold value. The at least one primary light sensor may react sensitively to primary and secondary light or only to primary light.

The at least one primary light sensor may be couplable or coupled to an evaluation device, which compares e.g. the sensor signals with at least one threshold value. In the case of a plurality of threshold values, the latter may correspond to different degrees of failure. The evaluation device may be integrated into the lighting device or be a device independent of the lighting device.

The evaluation device may be couplable or coupled to a control device. As a result, at least one action can be initiated by the control device depending on a failure or a degree of failure. In one configuration, therefore, at least one primary light sensor is situated in the light propagation direction of the primary light through the phosphor body, which at least one primary light sensor (directly or indirectly via further components) is couplable to a control device, which initiates at least one action in the event of a failure being ascertained.

The action may include e.g. flashing and/or dimming of the at least one light source, switching on at least one additional light source, outputting a warning indication and/or movement (displacement and/or pivoting) of at least one optical element. In this regard, movable optical elements can be used to alter the light path or beam path in the case of failure of the phosphor body. By way of example, a particularly suitable light emission pattern or a particularly suitable "emergency light distribution" can thus be realized.

The control device may be, for example, a control device for operating the at least one light source. This affords the advantage that the at least one light source is activatable depending on a failure or a degree of failure. In this regard, the control device may be designed to leave the at least one light source switched on in the case of a failure being positively ascertained. This affords the advantage that safety-increasing useful light can be emitted even in the case of failure.

In one development, the control device may control the at least one light source such that it remains switched on up to a relatively low degree of failure and is switched off only upon reaching a predefined higher degree of failure. Moreover, the control device may be designed to activate or switch on the at least one light source periodically or in a flashing manner in the case of a failure being ascertained. The flashing is very conspicuous and reliably indicates the case of failure to a user, e.g. a driver.

The evaluation device may be integrated into the control device. The control device then in particular also has an evaluation function. In this case, for example, the primary light sensor can be directly coupled or couplable to the control device. A particularly simple construction arises if the control device also constitutes a control device for the operation of the at least one light source.

The control device may be a component of the lighting device or be integrated into the lighting device, which affords the advantage of high operating autonomy. Alternatively, the control device may be a control device e.g. of a vehicle (for example an on-board electronic unit) which facilitates a simple and inexpensive construction of the lighting device.

In another configuration, moreover, the lighting device is a vehicle lighting device, in particular a luminaire, a lamp or a module. It may be e.g. a headlight or a part thereof, e.g. a lighting module.

In one configuration, the illumination pattern (of the useful light emitted by the phosphor body) is provided for roadway illumination, e.g. for generating a low beam, a high beam and/or a fog light, etc.

In one development, the light emission pattern (of the useful light emitted by the light scattering body) is also provided at least partly for roadway illumination.

In an alternative development, the light emission pattern is usable at least partly for signaling, e.g. as a daytime running light or as a position light.

Various embodiments provide a vehicle, including at least one lighting device as described above, e.g. in the form of a headlight. The vehicle may be embodied analogously to the lighting device and affords the same effects.

The vehicle may have for example the control device directly or indirectly coupled to the primary light sensor, e.g. an on-board electronic unit. In the case of identification of a failure, the control device may initiate at least one action, e.g. cause the at least one light source to flash and/or to output a warning indication.

The vehicle may be a land-based, airborne or waterborne vehicle, e.g. a motor vehicle (automobile, truck, etc.) or a motorcycle, etc.

Figure 1:
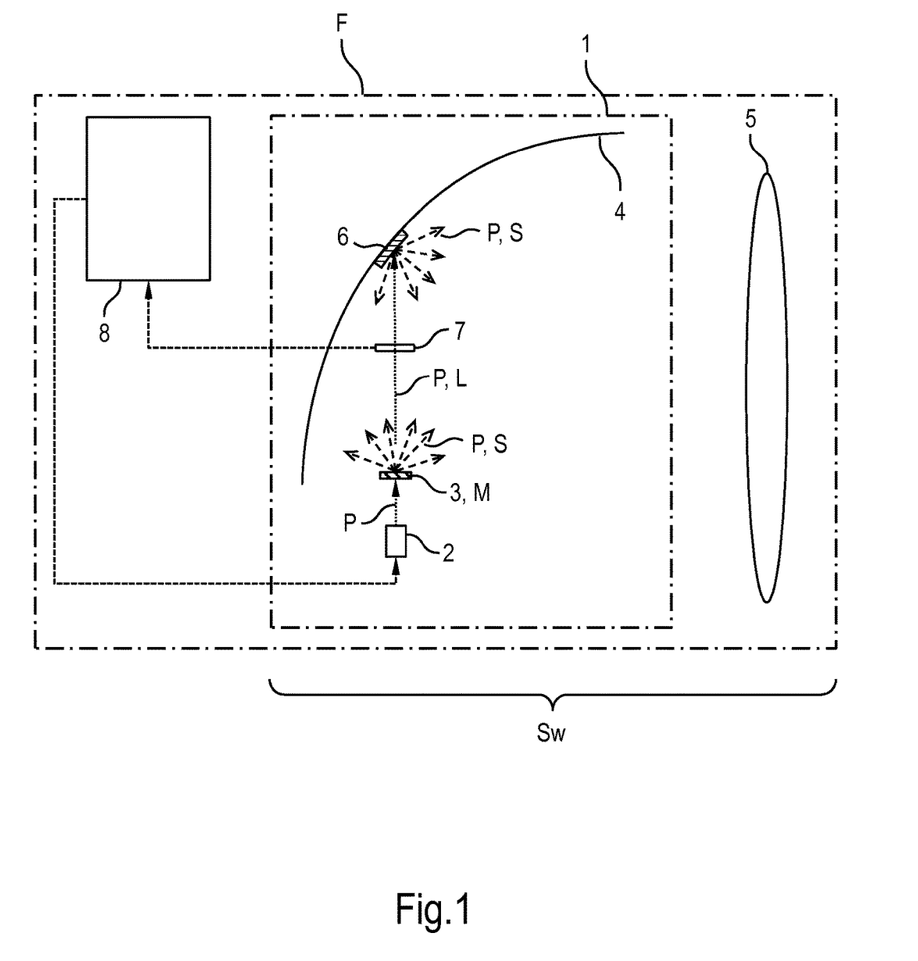
FIGS. 1 to 6 show, as sectional illustration in side view, components of a lighting device in accordance with a first to sixth exemplary embodiment.

FIG. 1 shows components of a lighting device in the form of a lighting module 1 for a motor vehicle F. The lighting module 1 constitutes part of a headlight Sw for the motor vehicle F.

The lighting module 1 includes at least one light source in the form of at least one laser diode 2 for emitting blue primary light P (e.g. having a wavelength of 450 nm). The primary light P generated when the laser diode 2 is activated is radiated onto a rear side of a laminar phosphor body 3 spaced apart therefrom. Said phosphor body 3 is designated hereinafter as "main phosphor body" 3 without restricting the generality.

The main phosphor body 3 contains phosphor that converts the blue primary light partly into yellow secondary light S such that a blue-yellow or white mixed light P, S is emitted as useful light at the front side of the main phosphor body 3. The main phosphor body 3 is therefore used in so-called transmission or transmitted light operation. In principle, however, reflection operation is also possible, in which the mixed light P, S is emitted at the same side of the main phosphor body 3 on which the primary light P is also incident. The position provided for the intact main phosphor body 3 is also designated as a normal position or "mounting position" M.

The mixed light P, S emitted as useful light by the main phosphor body 3 is incident on a specularly or diffusely reflective inner side of an e.g. parabolically or elliptically shaped reflector 4. The main phosphor body 3 is situated in particular at a focal point or focal spot of the reflector 4.

The reflector 4 deflects the mixed light P, S incident on it to a coupling-out optical unit 5, which is shown here in the form of a lens. However, it may also include still other optical elements, e.g. a diaphragm, etc. The coupling-out optical unit 5 shapes from the reflected mixed light P, S an illumination pattern for illuminating a roadway, e.g. in front of the motor vehicle F, said illumination pattern being emitted by the headlight Sw. The illumination pattern may be for example a low beam, a high beam, a cornering light, a fog light, etc.

The reflector 4 may be a component of the coupling-out optical unit 5.

There is arranged at the inner side of the reflector 4 a light scattering body in the form of a further phosphor body 6, which is designated hereinafter as "emergency phosphor body" 6, without restricting the generality.

The emergency phosphor body 6 is situated in a primary light shadow of the main phosphor body 3. This means that the primary light P in the case of an intact main phosphor body 3 does not impinge directly on the emergency phosphor body 6. However, mixed light P, S emitted by the main phosphor body 3, including its primary light proportion, may impinge on the emergency phosphor body 6. A proportion of the total mixed light P, S coupled out as useful light which is constituted by the mixed light P, S impinging on the emergency phosphor body 6 is low, however.

However, a failure of the main phosphor body 3 can occur, for example because it is damaged, e.g. since it has cracks or holes, or it is no longer situated at its mounting position M at all, e.g. since it has fallen off. In the case of failure, the primary light P passes in its light propagation direction or on an associated primary light path L through the mounting position M at least partly in a manner uninfluenced by the main phosphor body 3 and then impinges on the emergency phosphor body 6. In this sense, in the case of light propagation uninfluenced by the main phosphor body 3, the emergency phosphor body 6 is arranged "optically downstream" of the main phosphor body 3 or downstream of the mounting position M thereof.

The light emitted by the emergency phosphor body 6 in the case of failure may—as shown—likewise be mixed light P, S, but is not restricted thereto. In principle, the phosphor compositions and the conversion properties of the main phosphor body 3 and of the emergency phosphor body 6 may be identical or different. In this regard, for example, the light colors of the light emitted by the main phosphor body 3 and of the light emitted by the emergency phosphor body 6 may be identical or different. For example, the mixed light P, S emitted by the emergency phosphor body 6 in the case of failure may be white light with a yellow, red or blue cast.

The mixed light P, S emitted by the emergency phosphor body 6 in the case of failure is at least partly likewise projected into a region in front of the headlight Sw by the coupling-out optical unit 5. However, it may also partly be absorbed. As a result, a light emission pattern is generated which serves at least partly as an illumination pattern, e.g. as a low beam. This "emergency" illumination pattern may differ from the normal illumination pattern generated by the main phosphor body 3 for example in its color, shape, its brightness (e.g. its maximum radiation intensity) and/or brightness distribution. There is no need for any independent optical elements for the beam shaping of the light emitted by the emergency phosphor body 6. At least part of the mixed light P, S emitted by the emergency phosphor body 6 may be used as a signal light, e.g. as a position light, instead of or in addition to an illumination pattern.

A primary light sensor 7, which is sensitive at least to the primary light P, is situated in a part of the light path L of the primary light P (here between the main phosphor body 3 and the emergency phosphor body 6, if appropriate also downstream of the emergency phosphor body 6). If the main phosphor body 3 is intact, only a comparatively low luminous flux will impinge on the primary light sensor 7, such that its sensor signal is low. If the main phosphor body 3 has failed, however, the luminous flux incident on the primary light sensor 7 rises significantly, as a result of which the sensor signal output by the primary light sensor 7 also increases appreciably. The primary light sensor 7 takes up only one part of the primary light P passing in the light path L, while the other part passes to the emergency phosphor body 6. The primary light sensor 7 may alternatively be arranged alongside the (main) light path L of the primary light P, wherein part of the primary light P is then deflected as a test beam to the primary light sensor 7, e.g. by a reflector (not illustrated).

The primary light sensor 7 is coupled here to a control device of the vehicle F, e.g. to an on-board electronic unit 8. The on-board electronic unit 8 serves as an evaluation electronic unit for the primary light sensor 7 and may evaluate in particular the sensor signals of the primary light sensor 7 in order to ascertain a failure of the main phosphor body 3, for example by a comparison of a magnitude of the sensor signals with at least one threshold value. The on-board electronic unit 8 can furthermore control, e.g. activate, the at least one laser diode 2. In the case of a failure of the main phosphor body 3 being ascertained, the at least one laser diode 2 remains switched on or activated. The on-board electronic unit 8 can control the at least one laser diode 2 such that it flashes in order to direct the driver's attention to the failure. After the failure has been ascertained, the on-board electronic unit 8 can also initiate at least one other action, e.g. outputting of a warning indication.

A diffuser and/or a filter (not illustrated) may be situated between the main phosphor body 3 and the emergency phosphor body 6 in order to reduce a maximum beam intensity of the primary light P before impinging on the emergency phosphor body 6. Such optical elements can be situated additionally or alternatively optically downstream of the emergency phosphor body 6.

Figure 2:
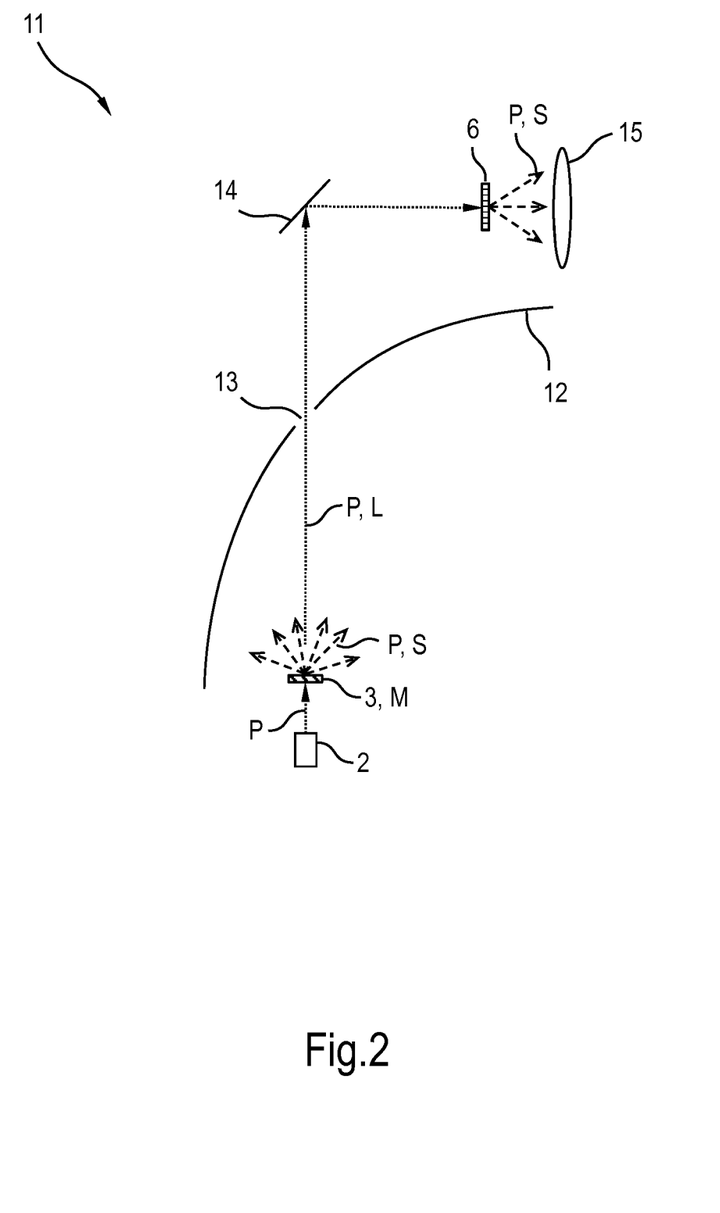

FIG. 2 shows components of a lighting module 11, which can be used e.g. in the headlight Sw from FIG. 1 instead of the lighting module 1. In contrast to the lighting module 1, in the case of failure, the primary light beam P is now radiated through a reflector 12, specifically through a small hole 13 onto a deflection mirror 14 serving as deflection element. The deflection mirror 14 directs the primary light P onto a rear side of the emergency phosphor body 6, which is operated in transmitted light operation. Consequently, the emergency phosphor body 6 emits mixed light P, S at its front side. This mixed light P, S may now again be beam-shaped by the coupling-out optical unit 5 as in the lighting module 1 and/or may, as shown, be coupled out alternatively or additionally through an optical unit 15 disposed downstream of only the emergency phosphor body 6, said optical unit being illustrated here in the form of a lens. The optical unit 15 may include for example at least one lens, at least one diaphragm, at least one diffuser and/or at least one reflector, etc.

This embodiment has the advantage that the mixed light P, S emitted by the emergency phosphor body 6 can be shaped and directed by the optical unit 15 at least partly independently of the optical unit disposed downstream of the main phosphor body 3, if appropriate including the coupling-out optical unit 5. In this regard, the light emission pattern associated with the emergency phosphor body 6 can be varied to a greater extent, e.g. as an illumination pattern or as a signal light.

Figure 3:
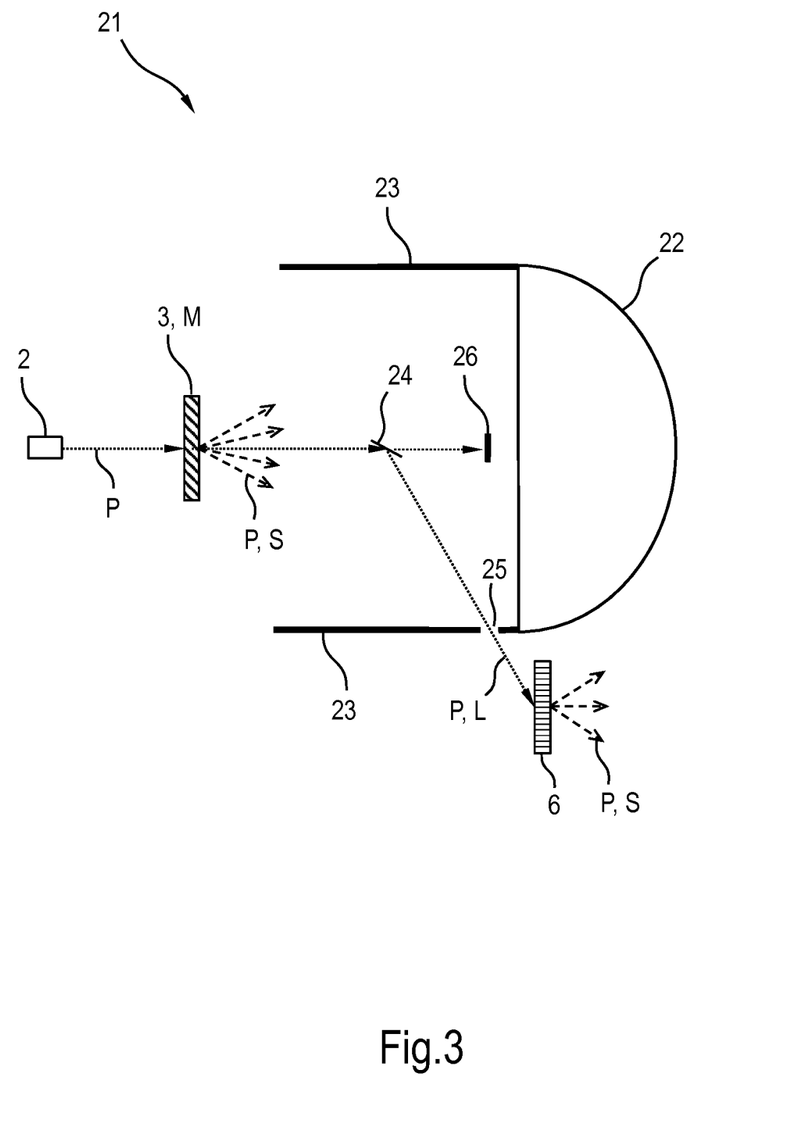

FIG. 3 shows components of a further lighting module 21, which can be used e.g. in the headlight Sw from FIG. 1 instead of the lighting module 1 or 11. Now there is no reflector disposed downstream of the main phosphor body 3, but rather a transmitted light element in the form of a collimation lens 22. The collimation lens 22 may be part of the coupling-out optical unit 5. It may have a cylindrically curved edge.

When the laser diode 2 is activated, the mixed light P, S generated by the main phosphor body 3 is radiated predominantly directly into the collimation lens 22. Mixed light P, S radiated laterally past the collimation lens 22 can be absorbed by a light-absorbing housing wall 23.

A deflection mirror 24 is situated in the primary light path L optically upstream of the housing wall 23 and upstream of the emergency phosphor body 6.

In a first variant, the deflection mirror 24 may deflect all light incident on it, specifically through an opening 25 in the light-absorbing housing wall 23 onto the emergency phosphor body 6, which is thus laterally offset with respect to the collimation lens 22. If the main phosphor body 3 is intact, a small proportion of the mixed light P, S generated by it is directed by the deflection mirror 24 onto the emergency phosphor body 6, which can then be luminous weakly, for example. However, this proportion of the mixed light P, S that is directed onto the emergency phosphor body 6 is so small that it does not adversely affect an associated light function. If the main phosphor body 3 has failed, however, the primary light P uninfluenced by the main phosphor body 3 is deflected onto the emergency phosphor body 6 by the deflection mirror 24. The mixed light P, S generated by the emergency phosphor body 6 can be beam-shaped e.g. in a manner similar to that in the case of the lighting module 11 independently or with at least partial use of optical elements that are also disposed downstream of the main phosphor body 3.

In a second variant, the deflection mirror 24 is partly transmissive to the primary light P and to the secondary light S. In this case, for example, a small absorption element 26 is disposed downstream of said deflection mirror. In the case of an intact main phosphor body 3, in comparison with the first variant, a smaller proportion of the mixed light P, S incident on the reflector 24 will thus be incident on the emergency phosphor body 6, while the other proportion impinges through the reflector 24 on the absorption element 26 and is absorbed there. If the main phosphor body 3 has failed, only one proportion of the primary light P uninfluenced by the main phosphor body 3 is also deflected onto the emergency phosphor body 6 by the deflection mirror 24, while the other proportion impinges through the reflector 24 on the absorption element 26 and is absorbed there. In comparison with the lighting module 11, with simple means it is thus possible to reduce a luminous flux of the mixed light P, S generated by the emergency phosphor body 6 or to decrease the brightness of said mixed light.

Figure 4:
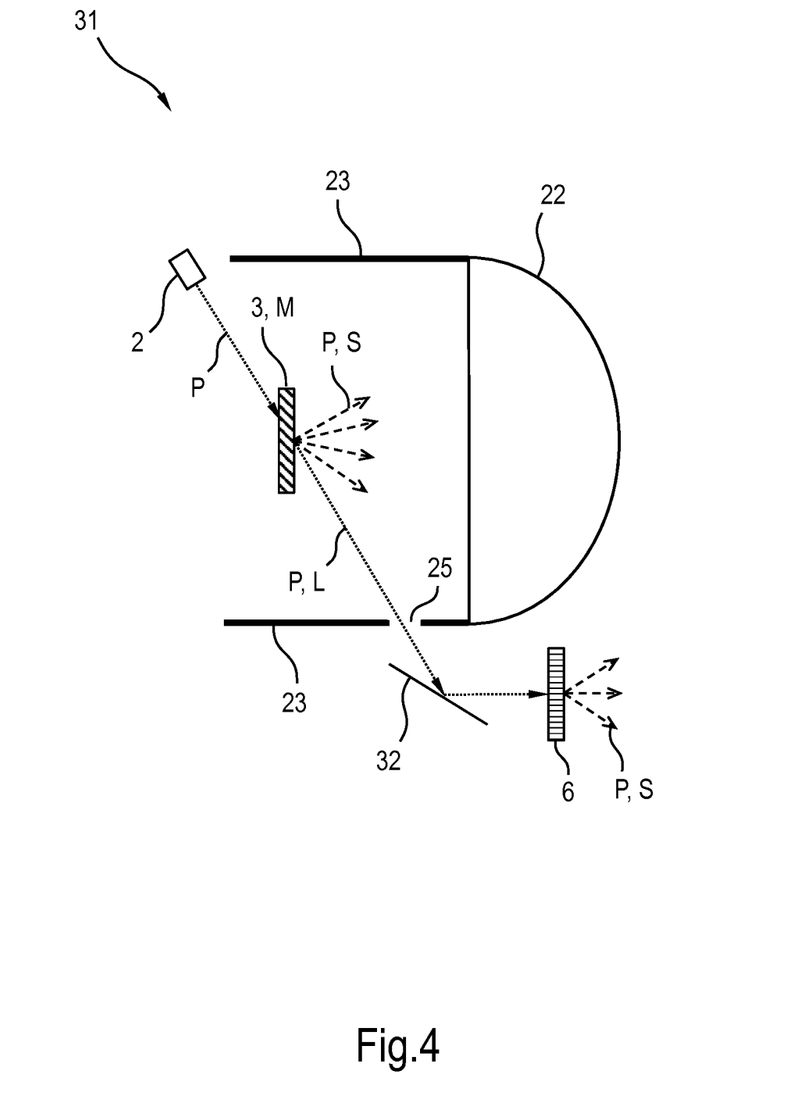

FIG. 4 shows components of yet another lighting module 31, which is constructed similar to the lighting module 21. However, the laser diode 2 is now aligned obliquely with respect to the main phosphor body 3, such that the primary light P emitted by it also impinges obliquely on the main phosphor body 3. The mixed light P, S emitted by the main phosphor body 3 at its front side is still emitted predominantly onto the collimation lens 22.

In the event of a failure of the main phosphor body 3, the primary light P no longer influenced by it is radiated on its primary light path L downstream of the mounting location M and directly through the opening 25 in the light-absorbing housing wall 23 and may be deflected there by a deflection mirror 32 onto the emergency phosphor body 6, which is offset laterally with respect to the collimation lens 22. The lighting module 31 thus requires neither the reflector 24 nor the absorption element 26 of the lighting module 21, which improves a luminous efficiency and a homogeneity of the illumination pattern in the case of an intact main phosphor body 3.

Figure 5:
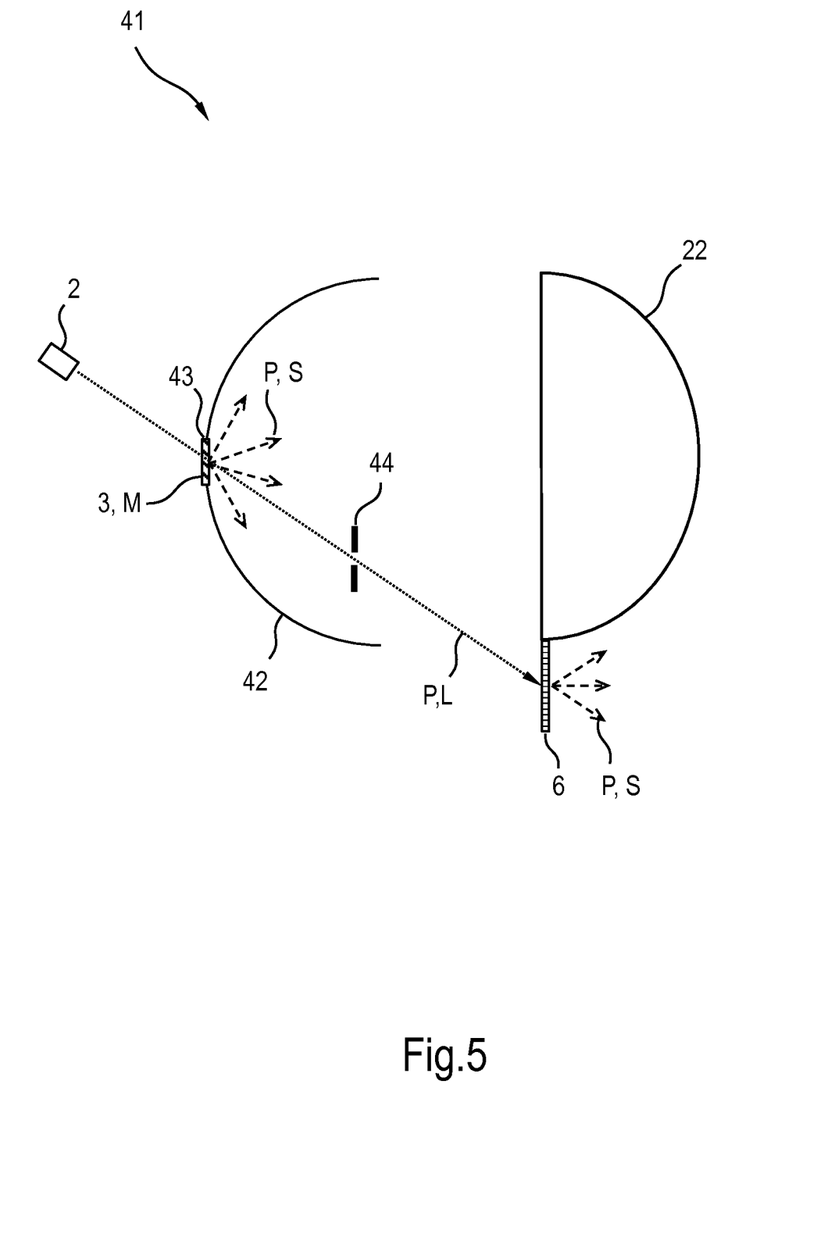

FIG. 5 shows components of a further lighting module 41, in which the primary light P is aligned obliquely with respect to the main phosphor body 3 in a manner similar to the lighting module 31.

The main phosphor body 3 is now arranged at a reflector 42, such that the mixed light P, S which is emitted by it and which is not radiated directly into the collimation lens 22 is at least partly reflected toward there by the reflector 42. This increases a luminous efficiency. The main phosphor body 3 here is arranged in a central opening 43 in the reflector 42, but may alternatively also be arranged e.g. at a focal point or focal spot of the reflector 42, e.g. analogously to FIG. 2.

In the event of a failure of the main phosphor body 3, the primary light P no longer influenced by it radiates on its primary light path L downstream of the mounting location M directly onto the emergency phosphor body 6, which is offset laterally with respect to the collimation lens 22. In this case, the primary light path L may contain a diaphragm, e.g. a pinhole diaphragm 44, which can constitute e.g. a part of a shutter. A light-absorbing housing wall 23 having an associated opening 25 may also be present (not illustrated). Instead of the (optional) pinhole diaphragm 44, the opening 25 can then serve as a pinhole diaphragm.

Figure 6:
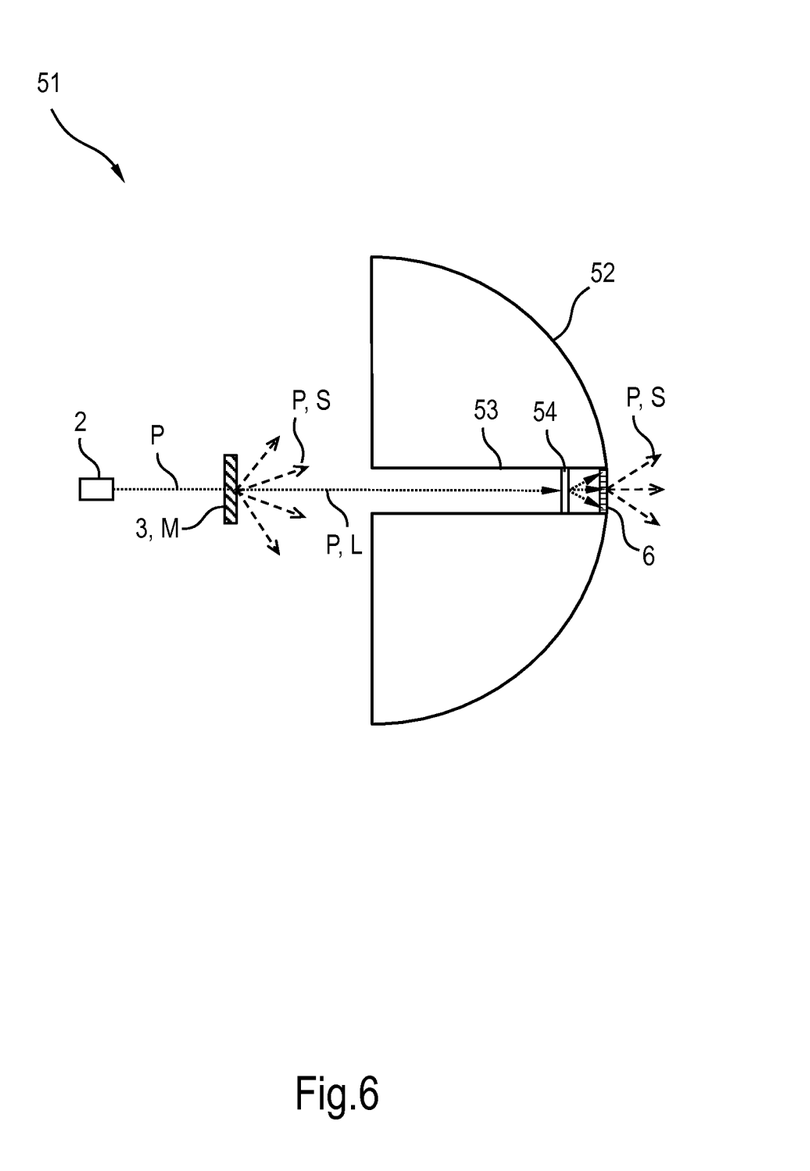

FIG. 6 shows components of yet another lighting module 51. The latter includes a transmitted light optical unit in the form of a lens 52 having a central, thin continuous channel 53. The channel 53 is centered around an optical axis (not illustrated) of the lens 52. The lens 52 may be e.g. a collimation lens, for example similar to the collimation lens 22. The emergency phosphor body 6 is situated at an end of the channel 53 facing away from the laser diode 2. The main phosphor body 3 is situated upstream of the lens 52.

The laser diode 2 emits the primary light along the optical axis of the lens 52. In the case of an intact main phosphor body 3, the majority of the mixed light P, S emitted thereby is radiated through the lens 52 outside the channel 53. A portion of the mixed light P, S enters the channel 53 and may partly enter the lens 52 from there. The remaining part of the mixed light P, S that has entered the channel 53 impinges on the emergency phosphor body 6. While the secondary light S thereof passes through in a manner scattered by the emergency phosphor body 6, at least part of the primary light P of the mixed light P, S is converted into secondary light S, such that at the emergency phosphor body 6 mixed light P, S is emitted which is shifted in color in the direction of the secondary light S in comparison with the mixed light P, S emitted by the main phosphor body 3. However, since the channel 53 is thin, the proportion of the mixed light P, S emitted by the emergency phosphor body 6, in comparison with the mixed light P, S emitted by the main phosphor body 3, is so small that the lighting function is not adversely affected.

A diffuser, e.g. a diffusing plate 54, which expands the light incident on it at the rear, can be situated upstream of the emergency phosphor body 6 in the channel 53.

If the main phosphor body 3 has failed, the primary light P uninfluenced by the main phosphor body 3 passes on the primary light path L through the channel 53. The primary light path L lies on the optical axis of the lens 52. In this case, the primary light beam P is so narrow that only little or no primary light P enters the lens 52 laterally. If the primary light P impinges on the emergency phosphor body 6, the latter is luminous like a point or quasi-point light source which emits the mixed light P, S. The diffusing plate 54, if present, serves to expand the primary light P such that the emergency phosphor body 6 is illuminated broadly. This reduces the local radiation loading thereof.

The lighting module 51 can be constructed particularly compactly and robustly.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

In this regard, components, arrangements, etc. of the embodiments shown can also be exchanged or combined with one another. In this regard, the lighting module 21 may be equipped with a reflector 42, 43 analogously to the lighting module 41.

Moreover, the light scattering body 3 may be a wavelength-maintaining light scattering body without a phosphor. It then only emits the primary light P.

Moreover, a primary light sensor 7 may be present in all the embodiments.

Generally, "a(n)", "one", etc. can be understood to mean a singular or a plural, in particular in the sense of "at least one" or "one or a plurality", etc., as long as this is not explicitly excluded, e.g. by the expression "exactly one", etc.

Moreover, a numerical indication can encompass exactly the indicated number and also a customary tolerance range, as long as this is not explicitly excluded.

REFERENCE SIGNS

1 Lighting module
2 Laser diode
3 Main phosphor body
4 Reflector
5 Coupling-out optical unit
6 Emergency phosphor body
7 Primary light sensor
8 On-board electronic unit of the motor vehicle
11 Lighting module
12 Reflector
13 Hole in the reflector
14 Deflection mirror
15 Optical unit
21 Lighting module
22 Collimation lens
23 Housing wall
24 Deflection mirror
25 Opening in the housing wall
26 Absorption element
31 Lighting module
32 Deflection mirror
41 Lighting module
42 Reflector
43 Opening in the reflector
44 Pinhole diaphragm
51 Lighting module
52 Lens
53 Channel
54 Diffusing plate
L Primary light path
F Motor vehicle
M Mounting position of the main phosphor body
P Primary light
S Secondary light
Sw Headlight

What is claimed is:

1. A lighting device, comprising:
at least one light source for emitting primary light;
at least one phosphor body which is illuminatable by the primary light and is spaced apart from the at least one light source; and
at least one light scattering body which is situated optically downstream of the phosphor body in a light propagation direction of the primary light that is uninfluenced by the phosphor body;
wherein the lighting device is designed
in the case of an intact phosphor body to generate an illumination pattern by light generated by the phosphor body; and
otherwise to generate a light emission pattern by light generated by the at least one light scattering body; which light emission pattern differs from the illumination pattern.

2. The lighting device of claim 1,
wherein the light emission pattern is a further illumination pattern.

3. The lighting device of claim 1,
wherein the light emission pattern has a lower maximum radiation intensity than the illumination pattern.

4. The lighting device of claim 1,
wherein at least partly different optical units are disposed downstream of the phosphor body and the light scattering body.

5. The lighting device of claim 1,
wherein the light scattering body is a phosphor body.

6. The lighting device of claim 1,
wherein the light scattering body is a wavelength-maintaining light scattering body.

7. The lighting device of claim 1,
wherein at least one deflection element is situated between the phosphor body and the light scattering body and is designed to deflect the primary light onto the light scattering body in the case of failure.

8. The lighting device of claim 1,
wherein the at least one light scattering body is arranged at a channel of a transmitted light optical unit.

9. The lighting device of claim 1,
wherein a primary light sensor is situated in the light propagation direction of the primary light through the phosphor body, which primary light sensor is couplable to a control device for the at least one light source, which control device leaves the at least one light source switched on in the event of a failure of the phosphor body being ascertained.

10. The lighting device of claim 1,
wherein at least one primary light sensor is situated in the light propagation direction of the primary light through the phosphor body, which at least one primary light sensor is couplable to a control device, which initiates at least one action in the event of a failure of the phosphor body being ascertained.

11. The lighting device of claim 9,
wherein the control device is designed to operate the at least one light source in a flashing fashion in the event of a failure of the phosphor body being ascertained.

12. The lighting device of claim 1,
wherein the lighting device is a vehicle luminaire or a part thereof and both the illumination pattern and the light emission pattern are at least partly provided for roadway illumination.

13. A vehicle, comprising:
at least one lighting device, comprising:
at least one light source for emitting primary light;
at least one phosphor body which is illuminatable by the primary light and is spaced apart from the at least one light source; and
at least one light scattering body which is situated optically downstream of the phosphor body in a light propagation direction of the primary light that is uninfluenced by the phosphor body;
wherein the lighting device is designed
  in the case of an intact phosphor body to generate an illumination pattern by light generated by the phosphor body; and
  otherwise to generate a light emission pattern by light generated by the at least one light scattering body;
  which light emission pattern differs from the illumination pattern.

\* \* \* \* \*